United States Patent [19]
Gentili

[11] 3,725,536
[45] Apr. 3, 1973

[54] METHOD OF THE CONTINUOUS PRODUCTION OF HYDROFLUORIC ACID

[76] Inventor: Renato Gentili, Rothausstrasse, Muttenz, Switzerland

[22] Filed: Nov. 13, 1970

[21] Appl. No.: 89,270

Related U.S. Application Data

[63] Continuation-in-part of Ser. No. 708,310, Feb. 26, 1968, Pat. No. 3,574,557.

[52] U.S. Cl. .................................. 423/485, 55/71
[51] Int. Cl. ........................... C01b 7/22, C01f 11/46
[58] Field of Search .............. 23/153, 122, 1 R; 55/71

[56] References Cited

UNITED STATES PATENTS

| | | | |
|---|---|---|---|
| 3,160,473 | 12/1964 | Hayworth | 23/153 |
| 2,932,557 | 4/1960 | List et al. | 23/153 |
| 3,004,829 | 10/1961 | Boyle et al. | 23/153 |
| 3,199,952 | 8/1965 | Zanon et al. | 23/153 |
| 2,690,815 | 10/1954 | Calfee et al. | 23/153 X |
| 3,063,815 | 11/1962 | Redniss | 23/153 X |
| 2,088,048 | 7/1937 | Bishop | 23/153 X |

FOREIGN PATENTS OR APPLICATIONS

| | | | |
|---|---|---|---|
| 1,004,389 | 9/1965 | Great Britain | 23/153 |
| 387,614 | 2/1933 | Great Britain | 23/153 |
| 1,056,077 | 1/1967 | Great Britain | 23/153 |

*Primary Examiner*—Edward Stern
*Attorney*—Abraham A. Saffitz

[57] ABSTRACT

A method for the continuous production of hydrofluoric acid by the purification and condensation of the hot reaction gases created by the reaction between fluorspar and sulphuric acid, comprising leading the hot reaction gases, already freed from dust, to a scrubbing and stripping column where recycled washing acid absorbs heat and impurities, and from which the gases strip at the same time hydrogen fluoride. The still hot gases are then led to a scrubbing section, employing first impure hydrofluoric acid and then pure hydrofluoric acid, which absorbs further impurities in exchange for which pure hydrogen fluoride is stripped. The cooled gases go then to a fractional condensation stage, where substantial amounts of hydrofluoric acid of industrial purity are collected and volatile impurities, with some hydrogen fluoride are bled off to conventional absorption with fresh sulphuric acid, which HF-laden gas is then led to the scrubbing and stripping column where it absorbs heat and further impurities and from which the hot incoming reaction gases strip hydrogen fluoride. The hot washing acid then continuously overflows to the mixing tank and supplies the acid required for the continuous reaction producing the hydrofluoric reaction gases.

3 Claims, 1 Drawing Figure

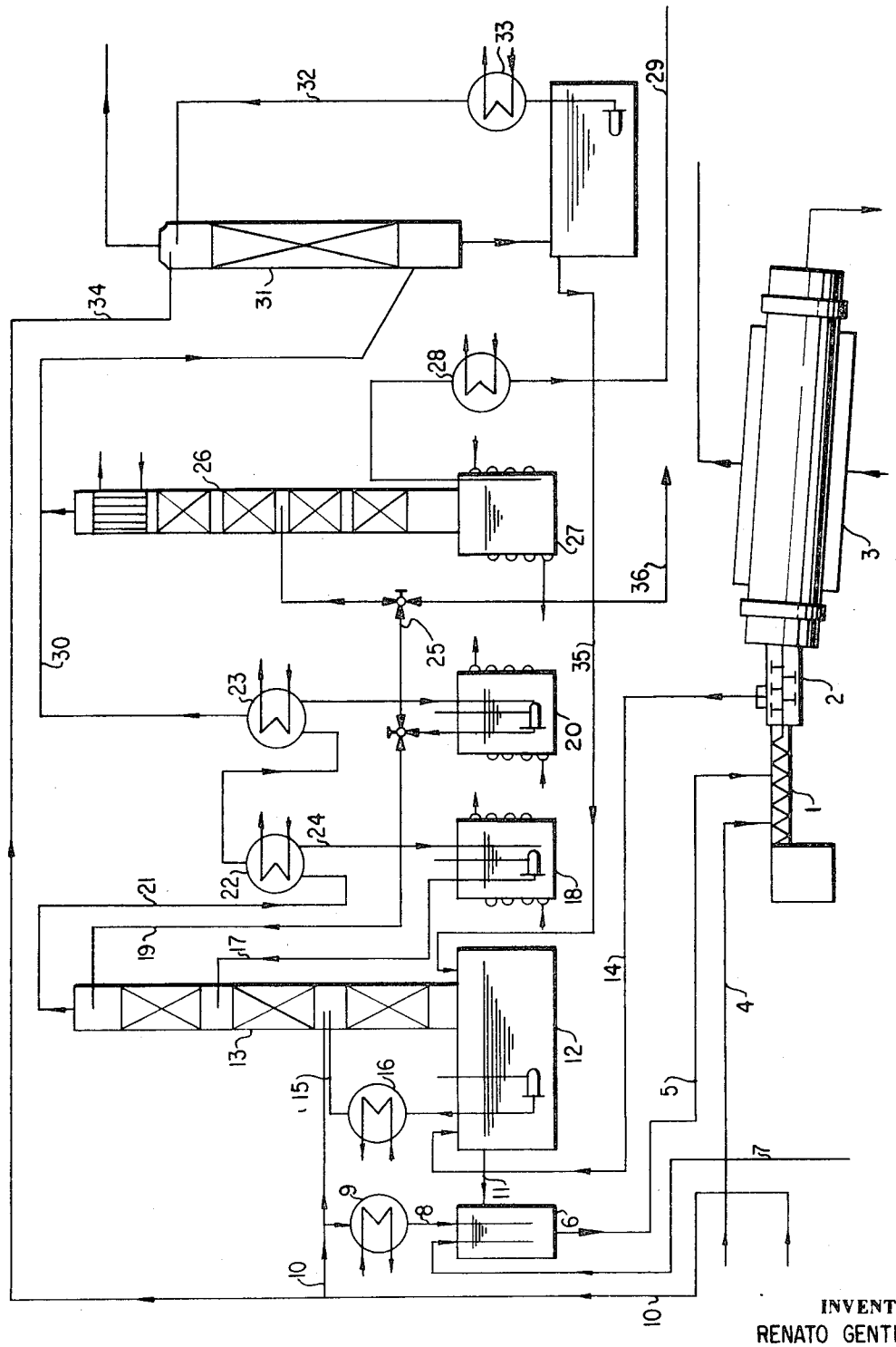

METHOD OF THE CONTINUOUS PRODUCTION OF HYDROFLUORIC ACID

CROSS REFERENCE TO OTHER APPLICATION

This is a continuation-in-part application of copending application Ser. No. 708,310, filed Feb. 26, 1968 now U.S. Pat. No. 3,574,557 granted Apr. 13, 1971, describing the multiple reactor and apparatus for generating and liberating the hot reaction gases.

BACKGROUND OF THE INVENTION

FIELD OF THE INVENTION

The present invention relates to a process for the troublefree continuous production of anhydrous hydrofluoric acid in quantity and with high purity using practically dustfree hot hydrofluoric acid gases, created by the reaction of fluorspar and sulphuric acid, and which are cooled, purified and strengthened by multiple stage scrubbing and then fractionally condensed, the first fraction being recycled and the second fraction being the high purity end product which then can be easily stripped of traces of volatile impurities by a reflux distillation under pressure.

This method achieves technical purity better than 99.5 percent and ultimate purity better than 99.9 percent.

SUMMARY OF THE INVENTION

The present invention discloses a method to liberate substantially all hot reaction gases and dust from a multiple reactor, and then to scrub the gases consecutively with a cooled washing acid, a cold crude hydrofluoric acid and finally with cold pure hydrofluoric acid, and subjecting recovered hydrogen fluoride containing low boiling impurities to a two-stage fractional condensation. A part of the cold pure hydrofluoric acid from the second condensation stage fed into a rectifying column drives out the low boiling impurities, whereas another part of the cold pure hydrofluoric acid is recycled to the top of the scrubbing tower. It is also of advantage to recycle the cold crude HF from the first condensation stage for scrubbing into the upper third of the scrubbing tower.

The off-gas from the condensers and the rectifying column consists of the non-condensable gases, low boiling impurities and a small quantity of hydrogen fluoride, and a condensate of high purity is obtained.

The off-gas is then led to an absorption tower, where the remaining hydrofluoric acid is absorbed in countercurrent by fresh and concentrated sulphuric acid. A special advantage lies in the arrangement which allows the fresh sulphuric acid to be fed without special consideration of the optimum quantity thereof required into the absorption column from which it overflows into the lower part of the scrubbing column.

The fresh hot reaction gases enter with the hydrogen fluoride and heat the washing acid, when then flows over to the mixing tank feeding the multiple stage reactor.

PREFERRED EMBODIMENT OF THE INVENTION

An example of a preferred embodiment is illustrated on the attached schematic diagram.

Referring to the diagram and numerals of reference thereon, the process plant has a continuously operating multiple-stage kneading reactor 1, with separate inlets 4 and 5 for the fluorspar and the sulphuric acid and a pipe 14 for the escape of the hot reaction gases. The worm feed into the first stage of the kneading reactor which is shown diagrammatically and the kneading portion with the kneading blades shown in diagrammatic form is shown within the structure represented by reference numeral 2.

Finely ground fluorspar is proportioned and fed after drying through chute 4 into the inlet of the first stage 1 of the reactor, having a separate inlet connected by pipe 5 to the proportioned overflow of the acid mixing tank 6 into which a pipe 7 leads for feeding oleum, and a further pipe 8 leading through a heat exchanger 9 brings in sulphuric acid. The fluorspar and acid mixture is discharged into a second or final reactor 3 which is inclined as shown in the drawing. Hot reaction gases from the final reactor 3 flow counter current through degasifier No. 2. The acid mixing tank 6 is also provided with a pipe 11 connecting to the sump 12 of the scrubbing column 13.

Fluorspar is reacted intensively in the heated reactor 1 with the very hot mixed acid. The mixed acid is prepared in the tank 6 and consists of the hot washing acid through pipe 11 from the sump 12 of the scrubbing column 13, heated and concentrated sulphuric acid through pipe 8, and oleum through pipe 7. Some of the heat required for the following reaction of the fluorspar with the acid is obtained by heat exchange between the evolved reaction gases and the washing acid.

Further heat is generated by the mixture of the oleum and the sulphuric acid with the washing acid, by virtue of the remaining water in the washing acid and in the oleum being converted by dilution to sulphuric acid. This heat raises the temperature of the acid mixture in the tank 6.

As the reaction proceeds, large volumes of hydrogen fluoride are avoided in the reactor from which these gases are withdrawn through a pipe 14 communicating with the bottom part 12 of the scrubbing column 13.

The hot reaction gases ascend the scrubbing column 13 where they enter into the mass and effect heat exchange therewith, the washing acids trickling down from above. Three different washing acids are used. A cooled washing acid is sprayed into the lower section of the scrubber 13. This is withdrawn in the hot condition from the bottom part 12 through a pipe 15 and is conveyed through a heat exchanger 16, where it is cooled to about 40° to 50° C. Moreover, the cooled washing acid may be enriched by the admixture of cold concentrated sulphuric acid. The washing acid introduced into the lower section of the scrubbing tower through a pipe 15 trickles into the hot rising reaction gases with a resultant intense direct heat exchange. The considerable temperature rise of the washing acid leads to HF being desorbed, whereas at the same time the high boiling impurities are scrubbed out of the rising reaction gases.

Through a further pipe 17, a cold crude hydrofluoric acid is introduced into the scrubbing tower from a receiving tank 18 so that the gases which are still hot are thus scrubbed again. The removal of high boiling impurities from the ascending gases is thus continued, and the temperature of the gases is further reduced. Finally, cold hydrofluoric acid, which is taken from a receiving tank 20 and is now very pure, is pumped into the head of the scrubber through a pipe 19.

The gases leaving the scrubbing tower 13 overhead through a pipe 21 contain the low boiling impurities. They are fractionally condensed in separate condensers 22 and 23. The first condenser 22 is cooled with cold water and the second, to a lower temperature, with brine. The slightly less pure preliminary condensate from the condenser 22 is taken through a pipe 24 into a receiver 18, whereas highly pure hydrofluoric acid from the condenser 23 is collected from the condenser 23 in a receiver 20. A part of the cold hydrofluoric acid from this receiver 20 is taken through the pipe 19 into the upper part of the scrubber 13 and the remainder enters a rectifying column 26 through a pipe 25. The rectifying column 26 is operated at a gauge pressure of between 1 and 10 atmospheres and serves for driving out the residual low boiling impurities. A hydrofluoric acid of maximum purity flows out of the bottom 27 of the rectifying column 26 and, after having been cooled in a heat exchanger 28, it is pumped through a pipe 29 into the reservoirs. The exhausted gases from the condenser 23 and from the rectifying column 26 are conveyed in a main trunk 30 to the bottom of an absorption tower 31. The fresh absorbent is concentrated sulphuric acid conducted in countercurrent, also taken partially from the bottom of the tower through a pipe 32. This part of the acid is cooled in a heat exchanger 33.

The fresh cold sulphuric acid is introduced continuously through a pipe 34 and trickles down from the head of the absorption tower 31, so that a corresponding quantity can overflow continuously through pipe 35 into the lower section of scrubber 13. The small volume of residual gaseous impurities emerging from the head of the absorption tower 31 is then scrubbed in conventional manner with water before these gases are discharged. The discharge gases contain a little $SO_2$ and $CO_2$ in quantities within the permissible limits and hardly measurable traces of hydrogen fluoride.

For the purpose of illustrating the invention, an example will be described below:

EXAMPLE 1,360 kg per hour of a 97 percent pure fluorspar are introduced continuously into the reactor 1 together with acid from the acid mixing tank 6. The acid mixture in the tank 6 is formed from hot recycled washing acid which enters continuously from the washing stage and with fresh hot concentrated 98 percent sulphuric acid in an amount of about 350 kg per hour, this acid mixture being heated by a further addition of 750 kg per hour of oleum. The acid mixture is sprayed into the reactor from the pipe 5. The reaction produces about 1,050 kg/h of reaction gases having an HF content slightly exceeding 80 percent and about 2,300 kg/h of anhydrite, which is discharged by an inclined continuous screw, the filling forming a seal against the interior of the reactor.

The gases leaving the scrubbing column 13 contain more than 90 percent HF after they have been scrubbed. After condensation, the hydrofluoric acid collecting in the receiver 20 is of a purity exceeding 99.5 percent. This hydrofluoric acid can be used as a hydrofluoric acid of industrial purity for a large number of purposes without further treatment and can be withdrawn in this high purity from the receiver 20 through a pipe 36. The condensing process is so controlled that the residual gases containing low boiling impurities enter the absorption tower 31 at the rate of about 300 kg/h containing about 80 percent HF. About 540 kg/h of a cold 98 percent sulphuric acid are introduced into this tower. After absorption, about 80 kg/h of gases leave the absorption tower. Their HF content is reduced to less than 30 percent and the proportion of air is about 20 percent. From the absorption tower 31, about 760 kg/h of washing acid return into the lower section of the scrubber 13. The washing acid flowing through the pipe 35 contains about 30 percent HF, about 70 percent $H_2SO_4$, and from 1 to 3 percent water as an impurity.

In the above example, about 625 kg/h of hydrofluoric acid are diverted into the rectifying column 26. From the bottom of this column, about 613 kg/h of hydrofluoric acid, which is better than 99.9 percent pure, are withdrawn, whereas about 12 kg/h of HF together with the gaseous impurities escape from the tower overhead.

The continuous feed of fresh cold 98 percent sulphuric acid into the absorption tower permits efficient operation of the condensation and distillation stages, and a critical separation of HF from the off-gases escaping at the overhead is not required. The cold sulphuric acid with the absorbed HF flows over from the absorption tower into the lower section of the scrubbing column 13, where the hot entering reaction gases strip HF out of the washing acid during the heat exchange.

The proportion of dilute hydrofluoric acid is less than 2 percent as compared to the HF content of the reaction gas. This HF is removed from the gas leaving the absorption tower by being passed through conventional wet scrubbers charged with water or alkaline solution. The remaining 98 percent HF out of the reaction is continuously condensed at up to 99.5 percent purity. It should be noted that only small amounts of HF are continuously carried back in circulation between the bottom 12 of the scrubbing column connected to the acid mixing tank 6 and the reactor 1.

The method of the present invention provides the important advantages of reliability in long time continuous operation under remote control and economics in heat exchange which lower the external energy requirements for heating and for cooling.

While the process herein described constitutes a preferred embodiment of the invention, it is to be understood that the invention is not limited to this precise process and that changes may be made without departing from the scope of the invention which is defined in the appended claims.

What is claimed is:

1. A process for the continuous production of hydrofluoric acid in a purity of at least 99.5 percent from fluorspar and sulphuric acid in a heated reactor comprising:

a. mixing fluorspar in said heated reactor with a mixture of:

1. hot sulphuric acid, which contains about 30 percent HF, about 70 percent $H_2SO_4$ and from 1 to 3 percent water as an impurity and is the sulphuric acid returned from a first stage of a scrubbing column connected to said reactor and used for the direct heat exchange in said scrubbing column of the hydrogen fluoride vapors evolved from the chemical reaction of fluorspar and sulphuric acid;
2. cold concentrated sulphuric acid; and
3. oleum;

b. kneading the aforesaid mixture of acid, oleum and fluorspar, while mixing, in said heated reactor to provide a uniformly high rate of generation of ascending hydrogen fluoride vapors;

c. discharging the kneaded mixture into a second reactor having a large head space, said large head space being adapted for the evolution of vapors and for degasifying to said scrubbing column from which the hot washing acid is fed to said heated reactor;

d. scrubbing the hot reaction vapors in said scrubbing column by washing with sprayed sulphuric acid introduced into the lower section of said scrubbing column;

e. washing the hydrogen fluoride vapors in said scrubbing column with crude cold hydrofluoric acid in a concentration of more than 90 percent;

f. finally washing the hydrogen fluoride vapors with pure cold hydrofluoric acid at a higher zone in the scrubbing column, and g. condensing said vapors of hydrofluoric acid in a condenser to provide a purity of greater than 99.5 percent and free from volatile impurities.

2. A process for the continuous production of hydrofluoric acid in a purity of at least 99.5 percent from fluorspar and sulphuric acid in a heated reactor comprising:

a. mixing fluorspar in said heated reactor with a mixture of:
1. hot sulphuric acid, which contains about 30 percent HF, about 70 percent $H_2SO_4$ and from 1 to 3 percent water as an impurity and is the sulphuric acid returned from a first stage of a scrubbing column connected to said reactor and used for the direct heat exchange in said scrubbing column of the hydrogen fluoride vapors evolved from the chemical reaction of fluorspar and sulphuric acid;
2. cold concentrated sulphuric acid; and
3. oleum;

b. kneading the aforesaid mixture of acid, oleum and fluorspar, while mixing, in said heated reactor to provide a uniformly high rate of generation of ascending hydrogen fluoride vapors;

c. discharging the kneaded mixture into a second reactor having a large head space, said large head space being adapted for the evolution of vapors and for degasifying to said scrubbing column from which the hot washing acid is fed to said heated reactor;

d. scrubbing the hot reaction vapors in said scrubbing column by washing with sprayed cold sulphuric acid introduced into the lower section of said scrubbing column;

e. washing the hydrogen fluoride vapors in said scrubbing column with crude cold hydrofluoric acid in a concentration of more than 90 percent;

f. finally washing the hydrogen fluoride vapors with pure cold hydrofluoric acid at a higher zone in the scrubbing column;

g. first condensing said vapors of hydrofluoric acid in the two-stage condenser and then treating the second stage condensate in a rectifying column to provide a purity of greater than 99.5 percent and free from volatile impurities; and h. treating the exhaust vapors from said two-stage condensation with sulphuric acid in an absorption tower.

3. A process as claimed in claim 2, wherein said cold hydrofluoric acid of a concentration greater than 90 percent and said cold pure hydrofluoric acid are condensed fractions in first and second stages, respectively, of a rectifying column connected to said scrubbing column.

* * * * *